United States Patent
Volkers et al.

(10) Patent No.: US 6,495,654 B1
(45) Date of Patent: *Dec. 17, 2002

(54) PROCESS FOR PREPARING POLYCARBONATE

(75) Inventors: Andre Volkers, Wouw (NL); Marcel Puyn, Swolgen (NL)

(73) Assignee: General Elecrric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/682,412

(22) Filed: Aug. 30, 2001

(51) Int. Cl.$^7$ .............................................. C08G 64/00
(52) U.S. Cl. ..................... 528/196; 528/198; 264/176.1
(58) Field of Search ................................. 528/196, 198; 264/176.1

(56) References Cited

U.S. PATENT DOCUMENTS

| | | | |
|---|---|---|---|
| 4,217,438 A | 8/1980 | Brunelle et al. ............. | 528/202 |
| 4,401,804 A | 8/1983 | Wooten et al. ............... | 528/272 |
| 4,532,290 A | 7/1985 | Jaquiss et al. ............... | 524/417 |
| 5,210,268 A | 5/1993 | Fukuoka et al. ............. | 558/270 |
| 5,306,801 A | 4/1994 | Sakashita et al. ........... | 528/198 |
| 5,319,066 A | 6/1994 | King, Jr. ...................... | 528/199 |
| 5,354,791 A | 10/1994 | Gallucci ...................... | 523/466 |
| 5,371,170 A | 12/1994 | Sakashita et al. ........... | 528/198 |
| 5,496,921 A | 3/1996 | Sakashita et al. ........... | 528/487 |
| 5,606,007 A | 2/1997 | Sakashita et al. ........... | 528/176 |
| 5,608,027 A | 3/1997 | Crosby et al. ................. | 528/51 |
| 5,717,057 A | 2/1998 | Sakashita et al. ........... | 528/198 |
| 5,834,615 A | 11/1998 | Nishihira et al. ........... | 558/274 |
| 5,922,816 A | 7/1999 | Hamilton ..................... | 525/446 |
| 5,942,594 A | 8/1999 | Nakae et al. ................. | 528/196 |
| 6,177,536 B1 | 1/2001 | Anamizu et al. ............ | 528/196 |

FOREIGN PATENT DOCUMENTS

| JP | 9059371 | 3/1997 |
|---|---|---|

Primary Examiner—Terressa M. Boykin

(57) ABSTRACT

A process for quenching a catalyst used in the manufacture of polycarbonate by melt polycondensation of a dihydroxy compound and a diester. The process includes adding a sulfonic acid ester quencher to the polycarbonate and extruding the polycarbonate, wherein the amount of sulfonic acid ester added to the polycarbonate is effective to reduce the amount of branching species generated during extrusion of the polycarbonate to less than 100 parts per million. The catalyst used in the melt polycondensation reaction is selected from the group consisting of sodium dihydrogen phosphite, cesium dihydrogen phosphate and disodium magnesium ethylenediaminetetraacetic acid.

16 Claims, 2 Drawing Sheets

CONVENTIONAL INTERFACIAL

MELT

PROCESS FOR PREPARING POLYCARBONATE

BACKGROUND OF INVENTION

This disclosure relates to a manufacturing method for preparing polycarbonates, and more particularly, to a manufacturing method for preparing polycarbonates by melt polycondensation of a dihydroxy compound and a diester carbonate in the presence of a catalyst.

Aromatic polycarbonates are used in a variety of applications due to their excellent mechanical and physical properties including, among others, impact and heat resistance, strength and transparency. There are three general processes known for the commercial manufacture of aromatic polycarbonates, which are illustrated in FIG. 1. The conventional interfacial process, as shown in FIG. 1A, and the phosgene-based melt process, as shown in FIG. 1B, start with the reaction of phosgene with carbon monoxide. The third general process, a "no phosgene" melt process as shown in FIG. 1C, was developed to eliminate the use of highly toxic phosgene in the process flow. Of these general methods, the "no phosgene" melt process shown is preferred since it prepares polycarbonates less expensively than the interfacial process and avoids the use of highly toxic phosgene.

Both types of melt processes (FIGS. 1B, and 1C) make use of a diarylcarbonate, such as diphenylcarbonate (DPC) as an intermediate, which is polymerized with a dihydric phenol such as bisphenol A (BPA) in the presence of an alkaline catalyst to form a polycarbonate in accordance with the general reaction scheme shown in FIG. 2. This polycarbonate may be extruded or otherwise processed, and may be combined with additives such as dyes and UV stabilizers. In many cases, however, the presence of residual catalyst in the finished polycarbonate has a detrimental affect on the quality of the product, leading to poor color, a decrease in molecular weight, a decrease in transparency, or undesirable rheological properties. Residual catalyst may also interact with additives, detracting from their efficacy and rendering the polycarbonate prone to thermal decomposition. Thus, it is desirable to reduce the levels of residual catalyst to minimize these interactions. Such reduction is referred to as "quenching."

Efforts to improve the stability of the finished polycarbonate has led to the use of alkali metal phosphorus-containing inorganic salts and/or alkaline earth metal phosphorus-containing inorganic salts as the catalyst. Of these phosphorus-containing salts, sodium dihydrogen phosphite and cesium dihydrogen phosphate are preferred for use in the melt polymerization process. In addition, the art now employs disodium magnesium ethylenediaminetetraacetic acid as a catalyst. These new catalyst materials require the addition of effective quenching compounds to prepare polycarbonates having acceptable residence stability.

SUMMARY OF INVENTION

A process for quenching a catalyst used in the manufacture of polycarbonate includes melt polycondensing an aromatic dihydroxy compound and a diester carbonate in the presence of a catalyst to produce a polycarbonate. The catalyst is selected from the group consisting of sodium dihydrogen phosphite, cesium dihydrogen phosphate and disodium magnesium ethylenediaminetetraacetic acid. A sulfonic acid ester quencher is added to the polycarbonate and the polycarbonate is extruded. The amount of sulfonic acid ester quencher added to the polycarbonate is effective to reduce the amount of branching species generated during extrusion of the polycarbonate to less than 100 parts per million.

These and other features will become better understood from the detailed description that is described in conjunction with the accompanying drawings.

BRIEF DESCRIPTION OF DRAWINGS

Referring now to the figures, which are meant to be illustrative, not limiting.

DETAILED DESCRIPTION

Figure 1A:
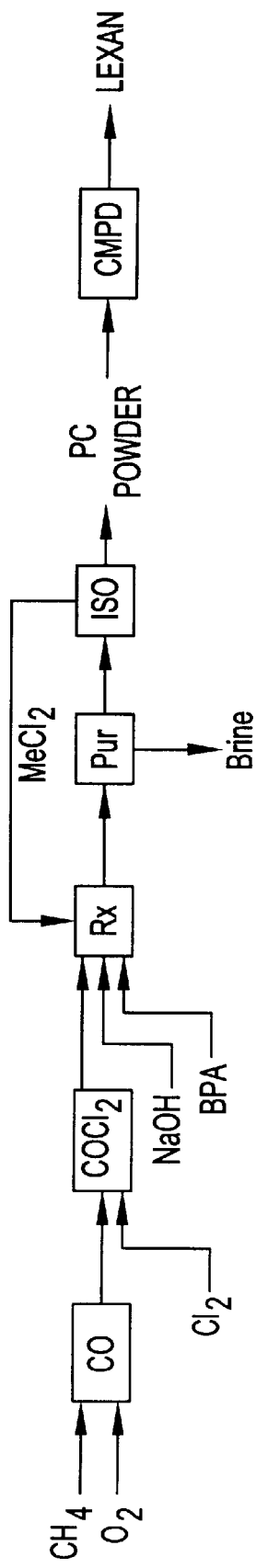
FIGS. 1a 1b 1c illustrates three prior art processes for the production of polycarbonate.
Figure 1B:
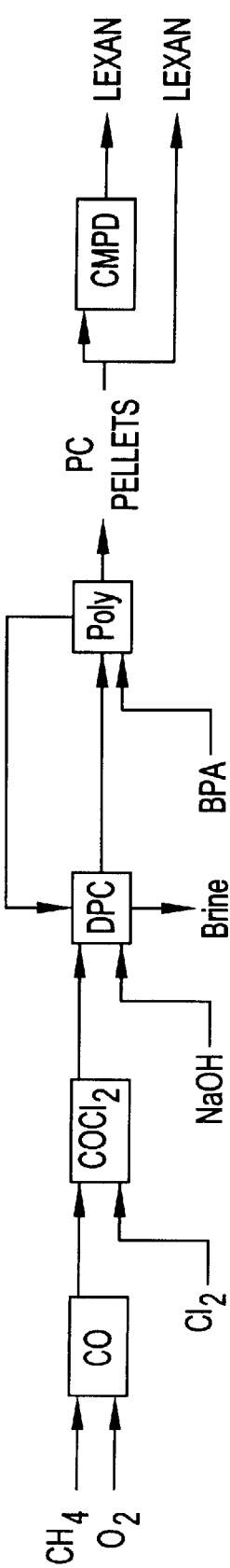
Figure 1C:
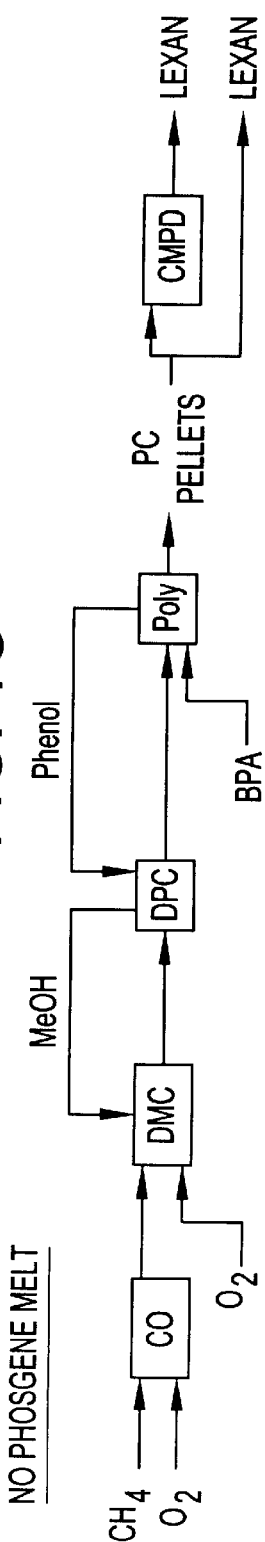
Figure 2:
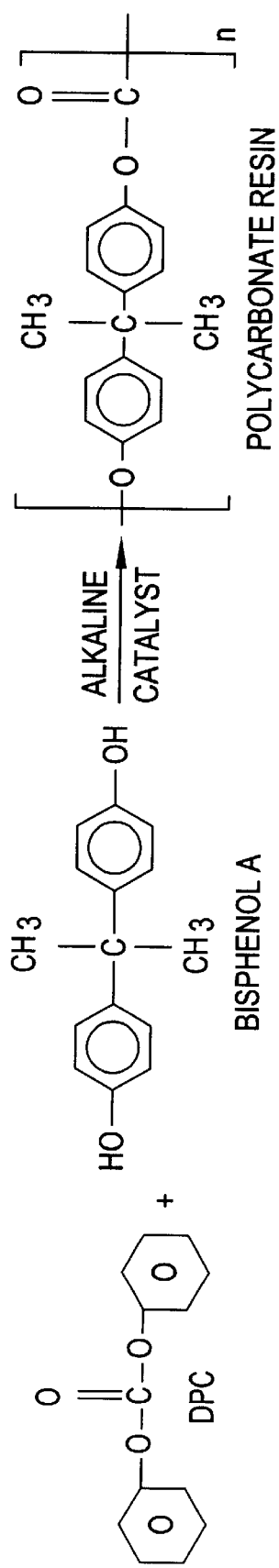
FIG. 2 illustrates a prior art process carried out in a base-catalyzed melt polycondensation reaction.

A method for preparing polycarbonates by melt polycondensation of a dihydroxy compound and a diester carbonate in the presence of a catalyst is described. The melt polycondensation reaction makes use of diarylcarbonate as an intermediate, which is polymerized with a dihydric phenol in the presence of a catalyst selected from the group consisting of sodium dihydrogen phosphite, as cesium dihydrogen phosphate and disodium magnesium ethylenediaminetetraacetic acid. Adding a quencher composition to the product of the melt polycondensation reaction produces stable polycarbonates, overcoming the problems noted in the prior art.

As used herein, the terms "polycarbonate", "polycarbonate composition", and "composition comprising aromatic carbonate chain units" includes compositions having structural units of the formula (I):

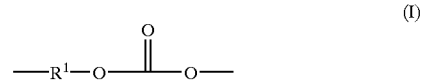

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative, non-limiting examples of radicals of this type are —O—, —S—, —S(O)—, —S(O$_2$)—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, and the like. In another embodiment, zero atoms separate $A^1$ from $A^2$, with an illustrative example being biphenol (OH-benzene-benzene-OH). The bridging radical $Y^1$ can be a hydrocarbon group or a saturated hydrocarbon group such as methylene, cyclohexylidene or isopropylidene.

Polycarbonates can be produced by the reaction of dihydroxy compounds in which only one atom separates $A^1$ and $A^2$. As used herein, the term "dihydroxy compound" includes, for example, bisphenol compounds having general formula (III) as follows:

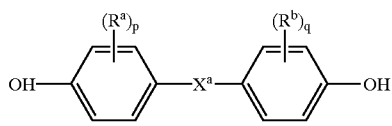
(III)

wherein $R^a$ and $R^b$ each independently represent hydrogen, a halogen atom, or a monovalent hydrocarbon group; p and q are each independently integers from 0 to 4; and $X^a$ represents one of the groups of formula (IV):

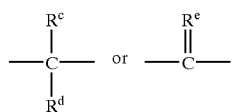
(IV)

wherein $R^c$ and $R^d$ each independently represent a hydrogen atom or a monovalent linear or cyclic hydrocarbon group, and $R^e$ is a divalent hydrocarbon group.

Some illustrative, non-limiting examples of suitable dihydroxy compounds include dihydric phenols and the dihydroxy-substituted aromatic hydrocarbons such as those disclosed by name or formula (generic or specific) in U.S. Pat. No. 4,217,438. A nonexclusive list of specific examples of the types of bisphenol compounds that may be represented by formula (III) includes the following: 1,1-bis(4-hydroxyphenyl)methane; 1,1-bis(4-hydroxyphenyl)ethane; 2,2-bis(4-hydroxyphenyl)propane (hereinafter "bisphenol A" or "BPA"); 2,2-bis(4-hydroxyphenyl)butane; 2,2-bis(4-hydroxyphenyl)octane; 1,1-bis(4-hydroxyphenyl)propane; 1,1-bis(4-hydroxyphenyl)n-butane; bis(4-hydroxyphenyl) phenylmethane; 2,2-bis(4-hydroxy-1-methylphenyl) propane; 1,1-bis(4-hydroxy-t-butylphenyl)propane; bis (hydroxyaryl) alkanes such as 2,2-bis(4-hydroxy-3-bromophenyl)propane; 1,1-bis(4-hydroxyphenyl) cyclopentane; 4,4-biphenol; and bis(hydroxyaryl) cycloalkanes such as 1,1-bis(4-hydroxyphenyl) cyclohexane; and the like as well as combinations comprising at least one of the foregoing bisphenol compound.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecandioic acid. Polyarylates and polyester-carbonate resins or their blends can also be employed.

Preferred polycarbonates are based on bisphenol A, in which each of $A^1$ and $A^2$ is p-phenylene and $Y^1$ is isopropylidene. Preferably, the weight average molecular weight of the polycarbonate is about 5,000 to about 100,000 atomic mass units, more preferably about 10,000 to about 65,000 atomic mass units, and most preferably about 15,000 to about 35,000 atomic mass units.

The polycarbonate composition may also include various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; blowing agents; and the like, as well as combinations comprising at least one of the foregoing additives.

The melt polycondensation reaction generally takes place in a series of reactors. In general, the temperature is increased and the pressure is reduced along the reactor train. Since the reaction is an equilibrium reaction, byproduct phenol is continuously removed from the reactors to ensure the desired or targeted molecular weight. The reaction preferably occurs at temperatures greater than about 260° C. More preferably, the temperature is in a range from about 270° C. to about 310° C. The pressure of the reaction is preferably reduced to a pressure less than about 0.8 torr. More preferably, the reactor is pressurized to a pressure within a range from about 0.2 to about 0.6 torr. Once the final polycarbonate target specifications have been reached, the quencher composition is added and mixture is passed through an extruder and pellitized.

The quencher compositions comprise a sulfonic acid ester having the general formula (V):

$$R_1SO_3R_2 \qquad (V)$$

wherein $R_1$ is hydrogen, $C_1$–$C_{12}$ alkyl, $C_1$–$C_{12}$ aryl, or $C_1$–$C_{18}$ alkylaryl; and $R_2$ is $C_1$–$C_{12}$ alkyl, $C_1$–$C_{12}$ aryl, or $C_1$–$C_{18}$ alkylaryl. In a preferred embodiment, the quencher is an alkyl tosylate. More preferably, the quencher is butyl tosylate. The amount of quencher in the quencher composition can be varied over a substantial range, since the carrier acts primarily as a diluent to facilitate uniform addition of small amounts of quencher to the product of the melt polycondensation reaction. Quencher compositions with higher concentrations of quencher can be used in smaller amounts, while quencher compositions with lower quencher concentrations are used in larger amounts to arrive at the same final levels of quencher. In general, the level of quencher in the quencher composition will be from about 0.1 to 10% by volume, preferably around 1%.

The quencher compositions are preferably formulated in a two carrier component system that effectively delivers the quencher to the product of the melt polycondensation reaction without the aforementioned processing difficulties. The first carrier component is a low boiling point solvent (lower boiling point than the quencher), which is capable of solubilizing the sulfonic acid ester quencher but which is essentially unreactive with the polycondensation product under conditions of high temperature and high vacuum. Examples of specific materials suitable for use as the first carrier component include xylene, toluene, benzene, chlorobenzene, anisole and ethylbenzene.

The second component is selected to have a higher boiling point than the sulfonic acid quencher, and to be soluble in the first component. This second component will frequently be a component of the melt condensation reaction, thus avoiding the introduction of impurities. Thus, suitable materials for use as the second component include diphenylcarbonate, phenol, bisphenol A, polycarbonate oligomers, bisphenol A derivatives and propylene carbonate.

The first and second components are combined in the quencher compositions at ratios of from about 4:1 to 1:4, preferably around 1:1. The resulting quencher composition is injected into a stream of melt polycondensation reaction product and processed (for example by extrusion) to disperse the quencher composition throughout the melt. The resulting products are high quality polycarbonate, and processing proceeds without the instabilities in flow rate observed when only the low-boiling solvent is utilized.

While to wanting to be bound by theory, it is believed that the basic catalyst in the polycarbonate is neutralized and stabilized; therefore, when different types of additives are added, the basic properties of the additives are not lost, and a polycarbonate composition with a high heat resistance, weather resistance, and moisture resistance can be produced.

The amount of quencher used to reduce the levels of residual catalyst has been found to be dependent on the particular quencher employed. Preferably, the amount of quencher added to the polycarbonate is in an amount effective to prevent a change in molecular weight or an increase in the amount of branching compounds after extrusion. The presence of residual catalyst in the polycarbonate causes crosslinking to occur during the extrusion process. Suppressing the reactivity of the catalyst in the finished polycarbonate results in improved processing and residence stability.

EXAMPLE 1

In this example, diphenylcarbonate and bisphenol A were polymerized with sodium dihydrogen phosphite catalyst in a mini-reactor operating at 300° C. and 1 millibar. The level of sodium dihydrogen phosphite catalyst was either $1 \times 10^{-6}$ mole/mole BPA or $3 \times 10^{-6}$ mole/mole BPA. A liquid solution at room temperature containing 1 part n-butyl tosylate and 99 parts toluene was injected into the reactor of the melt polycarbonate. The total amounts of quencher varied from 0 equivalents to 10 equivalents of the amount of catalyst. The reaction was continued and the changes in molecular weight and branching species were monitored. The results are shown in Table I.

TABLE I

Sodium Dihydrogen Phosphite Catalyst

| | n-Butyl Tosylate (equivalents) | Change in Mw (g/mole) | Change in Branching Species (ppm) | Amount of mol catalyst/mol aromatic dihydroxy compound |
|---|---|---|---|---|
| A* | — | 12,900 | 1,200 | $1 \times 10^{-6}$ |
| B | 1 | 650 | 40 | $3 \times 10^{-6}$ |
| C | 2 | 1,550 | 10 | $1 \times 10^{-6}$ |
| D | 6 | 20 | 25 | $3 \times 10^{-6}$ |
| E | 10 | 270 | 90 | $3 \times 10^{-6}$ |

*control

The results show that the greatest amount of molecular weight change and increase in branching species occurs when there is no quencher added. The effective amount of n-butyl tosylate added to quench the sodium dihydrogen phosphite has been determined to be about 1 equivalent.

EXAMPLE 2

In this example, diphenylcarbonate and bisphenol A were polymerized with sodium dihydrogen phosphite catalyst in a mini-reactor operating at 300° C. and 1 millibar. The level of cesium dihydrogen phosphate catalyst was either $1 \times 10^{-6}$ mole/mole BPA pr $3 \times 10^{-6}$ mole/mole BPA. A liquid solution at room temperature containing 1 part n-butyl tosylate and 99 parts toluene was injected into the reactor of the melt polycarbonate. The total amounts of quencher varied from 0 equivalents to 10 equivalents of the amount of catalyst. The changes in molecular weight and branching species were monitored as in Example 1. The results are shown in Table II.

TABLE II

Cesium Dihydrogen Phosphate Catalyst

| | n-Butyl Tosylate (equivalents) | Change in Mw (g/mole) | Change in Branching Species (ppm) | Amount of mol catalyst/mol aromatic dihydroxy compound |
|---|---|---|---|---|
| A* | — | 12,950 | 500 | $1 \times 10^{-6}$ |
| B | 1 | 2000 | 0 | $1 \times 10^{-6}$ |
| C | 2 | 630 | 0 | $1 \times 10^{-6}$ |
| D | 6 | 120 | 0 | $1 \times 10^{-6}$ |
| E | 10 | 80 | 0 | $3 \times 10^{-6}$ |

*control

The results show that the greatest amount of molecular weight change and increase in branching species occurs when there is no quencher added. The effective amount of n-butyl tosylate added to quench the cesium dihydrogen phosphate has been determined to be about 2 equivalents.

EXAMPLE 3

In this example, diphenylcarbonate and bisphenol A were polymerized with disodium magnesium ethylenediaminetetraacetic acid catalyst in a mini-reactor operating at 300° C. and 1 millibar. The level of disodium magnesium ethylenediaminetetraacetic acid catalyst was either $1 \times 10^{-6}$ mole/mole BPA or $3 \times 10^{-6}$ or $3.3 \times 10^{-7}$ mole/mole BPA. A liquid solution at room temperature containing 1 part n-butyl tosylate and 99 parts toluene was injected into the reactor of the melt polycarbonate. The total amounts of quencher varied from 0 equivalents to 10 equivalents of the amount of catalyst. The changes in molecular weight and branching species were monitored as a function of the amount of quencher added to the melt polycarbonate. The results are shown in Table III.

TABLE III

Disodium Magnesium Ethylenediaminetetraacetic Acid Catalyst

| | n-Butyl Tosylate (equivalents) | Changes in Mw (g/mole) | Changes in Branching Species (ppm) | Amount of mol catalyst/mol aromatic dihydroxy compound |
|---|---|---|---|---|
| A* | — | 11,000 | 140 | $3.3 \times 10^{-7}$ |
| B | 1 | 10,700 | 30 | $3.3 \times 10^{-7}$ |
| C | 2 | 2,370 | 60 | $3.3 \times 10^{-7}$ |
| D | 6 | 1,150 | 0 | $3.3 \times 10^{-7}$ |
| E | 10 | 0 | 0 | $3.3 \times 10^{-7}$ |

*control

The results show that the greatest amount of molecular weight change and increase in branching species occurs when there is no quencher added. Polymerization and formation of cross-linking species (branching species) is suppressed by the addition of about 2 equivalents n-butyl tosylate.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A process for quenching a catalyst used in the manufacture of polycarbonate, the process comprising:

melt polycondensing an aromatic dihydroxy compound and a diester carbonate in the presence of a catalyst to produce a polycarbonate, wherein the catalyst consists of an alkali metal phosphorus-containing inorganic salt or an alkaline earth metal phosphorus-containing inorganic salt or mixtures thereof;

adding a sulfonic acid ester quencher to the polycarbonate; and extruding the polycarbonate, wherein the amount of sulfonic acid ester added to the polycarbonate is effective to reduce the amount of branching species generated during extrusion of the polycarbonate to less than 100 parts per million.

2. The process according to claim 1, wherein the catalyst is selected from the group consisting of sodium dihydrogen phosphite, cesium dihydrogen phosphate and disodium magnesium ethylenediaminetetraacetic acid.

3. The process according to claim 1, wherein the sulfonic acid ester comprises a compound of formula $R_1SO_3R_2$, wherein $R_1$ is hydrogen, $C_1$–$C_{12}$ alkyl, $C_1$–$C_{12}$ aryl, or $C_1$–$C_{18}$ alkylaryl; and $R_2$ is $C_1$–$C_{12}$ alkyl, $C_1$–$C_{12}$ aryl, or $C_1$–$C_{18}$ alkylaryl.

4. The process according to claim 1, wherein the aromatic dihydroxy compound comprises bisphenol A and, wherein the diester carbonate comprises diphenyl carbonate.

5. The process according to claim 1, wherein the sulfonic acid ester comprises an alkyl tosylate.

6. The process according to claim 1, wherein the sulfonic acid ester comprises an n-butyl tosylate.

7. The process according to claim 1, wherein about one equivalent or greater of the sulfonic acid ester quencher based upon the amount of the catalyst is added to quench the sodium dihydrogen phosphite catalyst.

8. The process according to claim 1, wherein about two equivalents or greater of the sulfonic acid ester quencher based upon the amount of the catalyst is added to quench the cesium dihydrogen phosphate catalyst.

9. The process according to claim 1, wherein about two equivalents or greater of the sulfonic acid ester quencher based upon the amount of the catalyst is added to quench the disodium magnesium ethylenediaminetetraacetic acid catalyst.

10. The process according to claim 7, wherein adding the sulfonic acid ester produces an average molecular weight change between the polycarbonate and the extruded polycarbonate is less than 1000.

11. The process according to claim 8, wherein an average molecular weight change between the polycarbonate and the extruded polycarbonate is less than 1000.

12. The process according to claim 9, wherein an average molecular weight change between the polycarbonate and the extruded polycarbonate is less than 2500.

13. The process according to claim 1, wherein the sulfonic acid ester quencher comprises a first carrier having a boiling point less than the sulfonic acid ester quencher and a second carrier having a boiling point greater than the sulfonic acid ester quencher.

14. The process according to claim 13, wherein the first and second carriers are combined in the quencher compositions at ratios of from about 4:1 to 1:4.

15. A process for quenching a catalyst used in the manufacture of polycarbonate, the process comprising:

melt polycondensing an aromatic dihydroxy compound and a diester carbonate in the presence of a catalyst to produce a polycarbonate, wherein the catalyst consists of disodium magnesium ethylenediaminetetraacetic acid;

adding a sulfonic acid ester quencher to the polycarbonate; and extruding the polycarbonate, wherein the amount of sulfonic acid ester added to the polycarbonate is effective to reduce the amount of branching species generated during extrusion of the polycarbonate to less than 100 parts per million.

16. The process according to claim 15, wherein about one equivalents or greater of the sulfonic acid ester quencher based upon the amount of the catalyst is added to quench the disodium magnesium ethylenediaminetetraacetic acid catalyst.

* * * * *